Patented June 9, 1953

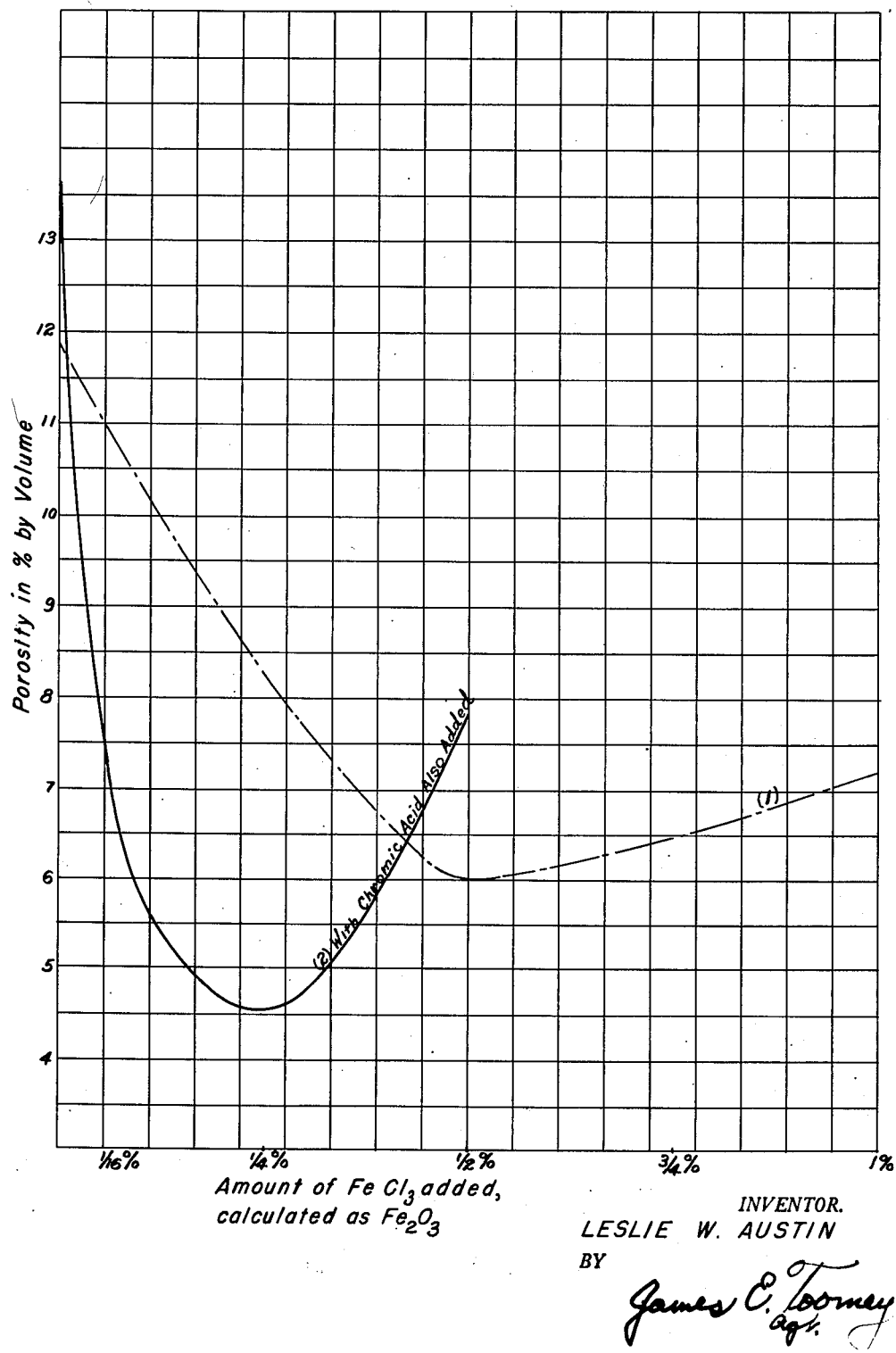

2,641,530

UNITED STATES PATENT OFFICE 2,641,530

PRODUCTION OF MAGNESIA

Leslie W. Austin, San Jose, Calif., assignor to Kaiser Aluminum & Chemical Corporation, a corporation of Delaware Application June 27, 1949, Serial No. 101,650

18 Claims. (Cl. 23—201)

This invention relates to a method of forming crystalline magnesia, or periclase, of high purity and of high density, with decreased effective surface, with the aid of a catalyst which enables crystallization to take place at temperatures much lower than those previously considered operable for material of comparable purity.

Magnesium oxide in relatively, high-purity state has been very difficult to prepare in crystalline form, heating to temperatures in excess of 2000° C. commonly being required for acceptable crystallization of even the technically pure grade. Even when fired as high as about 2200° C. the best non-fused product commercially available today has an apparent porosity of about 11% as measured by mercury displacement. Since such temperatures are very difficult to attain in fuel-fired furnaces, and since such porosity is higher than is acceptable for many purposes, crystalline magnesia of purity better than about 95% MgO is ordinarily prepared by fusion in electric furnaces. Such fusion is a difficult process and yields an expensive product which is relatively inert and unsatisfactory for some purposes. For example, unless of extremely high purity, the electrically fused material is difficult to bond together to form satisfactory high temperature ceramic articles.

In order to allow crystallization of the magnesia to take place at lower temperatures, such as those attainable in a rotary kiln, e. g. 1800° C. or less, it has been the practice to employ an admixture of from 5 to 15 percent of impurities such as silica, lime, alumina, and iron oxide along with the magnesia. These impurities flux with the magnesia, allowing sintering and crystallization to take place at temperatures within the range from about 1550° C. to 1800° C. depending upon the amount and kind of additives. Even with the larger amounts of impurities, the highest temperatures are required to produce a material having practically negligible residual shrinkage, i. e., under about 5% porosity.

Although useful in allowing the burning of the magnesia to be done at lower temperatures, the presence of the large amounts of impurities in the magnesia is objectionable for many purposes, as for example where danger exists of chemical contamination. When the crystalline magnesia material is to be used for ceramic or refractory purposes, the impurities markedly reduce the over-all refractoriness of the material, and even more markedly lower its ability to bear load at high temperatures and its resistance to thermal spalling and to corrosion by acidic materials.

An object of this invention is to provide a method for forming crystallized magnesia of increased density and of decreased effective surface. It is also an object of this invention to provide well-crystallized magnesium oxide of high purity without resorting to fusion or the addition of fluxes. Another object is to provide a method of forming crystalline, high purity magnesia at temperatures attainable in fuel-fired furnaces and, if desired, at high production rates. A further object is to provide a method whereby formation of crystalline magnesia from magnesia-yielding materials proceeds substantially to completion at much lower temperatures and more rapidly than has heretofore been possible with magnesia of comparable purity.

According to the present invention it has now been found that the crystallization of magnesia and the formation of well-crystallized magnesia or periclase from material which forms, or yields, periclase upon firing is improved catalytically by admixing with the starting material up to 1.0% of iron, calculated as $Fe_2O_3$ in the fired product. The iron is added in the form of a salt or other compound which is in the form of a solution or colloidal suspension in a suitable liquid. Mixtures of these additives can be employed. It has been found that amounts of the compounds indicated which will yield upon firing up to 1.0% additional content of the element calculated as the sesquioxide $Fe_2O_3$ in the fired product result in better crystallization of magnesium oxide at a given temperature, or equivalent crystallization at a lower temperature, when compared to similar material without the indicated compound additions. The amount of the element present is calculated as the sesquioxide in accordance with usual methods of expressing analyses of refractory compounds, but it is to be understood that it is not known exactly how the element exists in the fired product, as it may be more highly oxidized or may be present in the form of a compound, either as a spinel or as another compound. The quantities of iron compound additives required to improve the crystallization of magnesium oxide are very low, in terms of sesquioxide in the analysis of the fired material, ⅛ of one per cent or less being the optimum value in some cases. In general, the more pure the magnesia-yielding material, the greater the improvement in crystallization afforded by the addition. The best crystallization and the lowest apparent porosities have been obtained, when adding only the iron compound, from the purest starting materials and with about 0.5% $Fe_2O_3$ in the fired analysis. The method of this invention comprises admixing finely divided periclase-yielding compound and less than 1.0%, calculated as $Fe_2O_3$, of an iron compound as described, to form a uniform dispersion of the compound in the magnesium compound, and then heating to form crystalline magnesia.

It has also been found that the crystallization of the magnesia is greatly improved by the presence of a small amount of chromium compound in addition to the iron compound. The chromium compound provides $Cr_2O_3$ under the conditions of firing and can be added as the finely divided metal or in the form of a compound as, for example, sodium chromate or dichromate, potassium chromate or dichromate, ammonium chromate or dichromate, the chromates and dichromates of the alkaline earth metals, chromium nitrate, chloride acetate or sulfate, chromium oxide, etc., or mixtures thereof. The total amount of both iron and chromium compounds added is sufficient to provide less than 1.0% of total $Cr_2O_3$ plus $Fe_2O_3$ in the fired product, and optimum results are observed when adding compounds of these two elements in amounts to provide $\frac{1}{16}\%$ $Cr_2O_3$ and $\frac{1}{16}\%$ additional $Fe_2O_3$ in the fired product. It is found that the addition of the chromium compound along with the iron compound produces a periclase of increased toughness and hardness.

The magnesia-yielding material is a magnesium compound which will form or yield magnesia, magnesium oxide, upon firing. Such material is finely divided and includes magnesium hydroxide, magnesium carbonate, magnesium basic carbonate, magnesium alcoholate, etc. A suitable starting mterial is a high-purity natural magnesia or brucite. It is especially advantageous to employ as starting material a precipitated magnesium compound such as magnesium hydroxide, magnesium carbonate or basic carbonate etc., or cryptocrystalline magnesia. By cryptocrystalline magnesia is meant magnesium oxide which exists in very small crystals, that is, which has not reached crystallization equilibrium. Such magnesia, for example, is that obtained upon firing a magnesium carbonate, basic carbonate, hydroxide or the like to not over about 1200° C. for not over about 45 minutes. When these materials are so fired, the magnesia formed is not shrunken but exists in the cryptocrystalline state. It is improved as to crystal size and as to porosity by treatment according to the present invention. Another suitable starting material is finely divided hydrated magnesia. The magnesia obtained upon firing of any of these starting materials preferably contains at least 95% magnesium oxide and less than 2.0% CaO and less than 2% $SiO_2$. Especially good results are obtained when the iron content of the starting magnesium compound is less than 1% as $Fe_2O_3$, calculated on the ignited basis. Mixtures of such compounds can be employed. Preferably the magnesium compound starting material is of a particle size to pass through a screen having 100 meshes per linear inch (149 microns diameter); and still further improved operation is obtained when the starting material passes 200 mesh (74 microns diameter). While there is an appreciable iron content inherently present in the starting magnesia materials, this iron is evidently present in an inert form, or it may be poorly dispersed. Whatever the reason, it does not exhibit the effect on the crystallization of the magnesia upon firing which is obtained by adding the iron compounds described herein and according to the method of the present invention. It is to be understood that where it is stated herein that the iron compound is added to provide, for example, 0.5% $Fe_2O_3$ in the fired product, this means that this much iron as $Fe_2O_3$ is added in addition to whatever amount may be present in the magnesium compound starting material, and that such provided amount of iron does not represent the total, but only the added, amount of iron in the fired product.

The compounds described above which are useful in this invention are added in thorough and intimate admixture with the magnesia-yielding compound. This is effected by adding the compound is dispersion in a liquid, either in solution or in colloidal suspension. Water is a preferred solvent for the compound but any other suitable liquid can be used. There can be added as iron compounds, for example, ferric chloride, ferrous chloride, ferrous sulfate, ferric sulfate, ferrous nitrate, ferric nitrate, potassium ferro- or ferricyanide, sodium ferro- or ferricyanide, iron acetate, iron hydroxide, etc. A useful additive is waste pickle liquor from plating mills, which contains considerable ferric chloride. More than one of the iron compounds can be added.

The compounds which are useful in this invention are suitably made into a dispersion in a liquid and this dispersion intimately mixed with the starting periclase-yielding material. Alternatively, the periclase-yielding material is dispersed in a liquid, as in a slurry, and the iron compound added thereto. Preferably, the iron compound is dissolved in a liquid and then admixed with the periclase-yielding material.

It is an advantage of the present process that a mixture of the materials as described herein can be fired to crystallization equilibrium at a temperature about 400° C. below that required heretofore for firing magnesia of such purity. It is also an advantage that a denser product is obtained as measured in weight per unit volume. Furthermore, larger crystals are obtained than are obtained when the same magnesia or magnesium compound is fired alone, and without the addition of a compound as described. To obtain the desired final crystallization, the mixtures should be fired at a temperature at which shrinkage occurs, for example, at 1300° C. or higher.

The crystals of magnesia produced by the present process are usually polygonal in shape and approximately equidimensional. The fragments produced by crushing the larger pieces of such crystal aggregates to useful size are also approximately equidimensional, and they are also angular, dense and strong, and are therefore especially suitable for packing into dense shaped bodies. When chromium compounds containing the chromium in the positive radical are also added in the mixtures, the particles obtained upon firing and crushing are especially tough and therefore especially resistant to abrasion and impact.

The effect upon the apparent porosity of the product is demonstrated by the curves of the diagram of the drawing wherein porosity, in 30 percent by volume, is plotted against the sesquioxide content as indicated. This figure shows results obtained in two series of tests wherein (1) ferric chloride in water solution is added to magnesium hydroxide in amounts to give the $Fe_2O_3$ content indicated, on the fired basis, and the mixture dried, pressed and fired at 1700° C. for one-half hour; (2) to magnesium hydroxide are added ferric chloride in water solution in amounts to give on the ignited basis, the $Fe_2O_3$ content shown, and also chromic acid in each case in an amount to provide 0.25% $Cr_2O_3$ on the ignited basis, and the mixtures are dried, pressed and fired at 1700° C. In each series, a portion of the magnesium hydroxide is fired in the same way but without any additive. It is found that the porosities of the periclase agglomerates so formed decreases with small amounts of the additive, to a minimal value, and then increase up to about 1% total added sesquioxide content, beyond which value the crystallization proceeds as hitherto known, and the iron compounds behave as fluxing agents.

The preparation of the periclase agglomerates is described in the examples below.

*Example 1*

A magnesium hydroxide sludge is obtained by treating sea water with calcined dolomite to precipitate magnesium hydroxide, and then purifying the precipitate by washing with fresh water to remove soluble salts of lime and other contaminants. The sludge recovered has a pulp density of about 200% solids. A typical analysis of the solids of the starting sludge, on the ignited basis, is as follows: 1.19% $SiO_2$, 0.31% $Al_2O_3$, 0.39% $Fe_2O_3$, 1.12% CaO, 97.0% MgO (by difference). Ignition loss of the dried solids is 31.18%. To a portion of this sludge is added sufficient ferric chloride to yield 0.50% additional $Fe_2O_3$ in the fired product. The ferric chloride is dissolved in water, this solution is intimately blended with the magnesium hydroxide sludge, and the mixture is then dried, for example in a rotary drier. The dry solids are then pressed to form hard briquettes. These briquettes are fired in a suitable kiln, for example, a rotary kiln or a shaft kiln, to 1700° C. to 1800° C., the briquettes being in the hot zone for at least 20 to 30 minutes. The fired products are hard and well-crystallized, showing an apparent porosity of about 6.0% as determined by mercury displacement on a sample of sizes passing 6 mesh and retained on 10 mesh, using vacuum to remove entrained air. This product crushes to fragments which are approximately equidimensional, whereas material prepared in the same way but without the addition of ferric chloride crushes to weaker needle-like fragments, more difficult to pack densely, and exhibits an apparent porosity of about 11.8%.

*Example 2*

To 800 grams of magnesium hydroxide filter cake obtained by filtering a precipitated magnesium hydroxide sludge, produced by treating sea water with calcined dolomite, are added enough water to make a thick slurry, 0.665 gms. of chromic acid (to provide $\frac{1}{6}$% $Cr_2O_3$ in the fired product) and 1.41 gms. $FeCl_3-6H_2O$ (to provide an additional $\frac{1}{6}$% $Fe_2O_3$ in the fired product), and the whole intimately mixed. When thoroughly admixed, the material is dried and pressed into briquets. The briquets are fired in a pot kiln at 1705° C. for one-half hour. The grain so obtained is hard and has an apparent porosity of 5.72%. A portion of the same magnesium hydroxide, treated in the same manner except that no added agent is employed, exhibits upon firing in the same way a brittle grain having a porosity of 10.25%.

In other variations of this process, magnesia which is in the so-called "active" state, that is, which has not been heated to crystallization equilibrium and which is still crypto-crystalline, or even amorphous, can be employed as a starting material, as also can other magnesium compounds, such as magnesium carbonate or basic carbonate, magnesium acetate or the like, which upon firing yield, or form, magnesia.

In another variation of this process, particular advantages are obtained by employing a two-stage firing process. In one variant, the starting magnesium compound with the admixed iron compound, or with admixture of an iron compound and a chromium compound, is calcined to less than about 1300° C., or preferably to not over about 1200° C., or to the crypto-crystalline state but without effecting substantially complete shrinkage, that is the magnesia is still active; and then the calcined mixture is comminuted, pressed and fired at a temperature of at least 1300° C., and preferably at a temperature of from 1500° C. to 1750° C., to form well-crystallized periclase. In another variant, the magnesium compound is calcined to form cryptocrystalline magnesia, and the iron compound, or the iron compound with the chromium compound, is added to this cryptocrystalline magnesia, or to cryptocrystalline magnesia from any source, and the mixture of catalytic compounds and of cryptocrystalline magnesia so obtained is comminuted, pressed and fired as described above, to form well-crystallized periclase. A very dense and tough product is obtained by pressing a product containing cryptocrystalline magnesia in admixture with an iron additive, or with an iron additive and a chromium additive, and then firing to form well-crystallized periclase. Such an admixture can be obtained by mixing cryptocrystalline magnesia with the additive or additives as described, or by mixing the magnesia-yielding material with the additive or additives and calcining to the cryptocrystalline state. These variations, including the second firing step, produce a final periclase of very high density or, in other words, of very low porosity. This practice also provides a pressed material of increased strength, which better withstands tumbling or handling incidental to use. If desired, there can be mixed with the cryptocrystalline magnesia-containing material up to 90% of finely divided well-crystallized periclase, the mass pressed and fired as described.

Firing temperatures other than those shown in the examples, that is, of at least 1300° C., can be employed for sufficient periods of time to provide a well-crystallized grain. In a variation, also, chromite ore can be admixed with soda ash and magnesium hydroxide or carbonate and the whole calcined to form a sodium chromate-containing product, which can be employed in this invention. An iron compound is also provided by the chromite ore, which is a chrome-iron spinel. Suitably, equal parts by weight of chromite, soda ash and magnesium hydroxide are so calcined.

It is a particular advantage of this invention that a well-crystallized high-purity magnesia grain can be obtained by firing at temperatures considerably lower than are required for firing magnesia of such purity without the added compound or compounds. This invention enables firing such magnesia in a rotary kiln to obtain the desired crystallization, or at an equivalent temperature and for an equivalent time. If desired, the admixed substances, if in slurry form, can be introduced directly into the rotary kiln, and dried and fired in one operation.

The manner in which the invention functions to bring about better development of the crystallization of high-purity magnesias at lower firing temperatures is not completely understood, and, therefore, it is desired to be not limited by the following discussion of one theory of the operation.

When magnesia-yielding materials, particularly precipitated substances which, upon heating or firing, yield magnesia containing less than 2% $SiO_2$, and less than 2% CaO, or cryptocrystalline magnesia of the same purity, are so heated as to form magnesia in crystalline form, very little coalescence or crystal growth occurs and the magnesia crystals obtained are still very finely divided and of extensive surface. As stated hereinabove, electric fusion serves to form larger crystals but at high cost, and the addition of fluxing ingredients introduces substantial amounts of impurities which alter the physical and chemical characteristics of the product. It is apparent that the addition of a substance of the class described does not act in the manner of a fluxing agent because the optimum amounts employed are too small, increasing amounts yield higher porosities, and, furthermore, increasing amounts of other impurities which normally act as fluxing agents tend to hinder the mineralizing action of the added substance. These considerations are contrary to the operation of the commonly used fluxing materials. The effect of adding the substance as described is evidently not to cause fusion or sintering because the effect is apparently greater on higher purity material. The phenomenon is considered to be a catalytic or mineralizing effect because it has been observed that the small additions of the substances noted initiate crystallization of magnesia at lower temperatures, mature the crystallization more rapidly, and produce better crystallization than is obtained with the untreated magnesia. This invention enables the production of well-crystallized periclase by firing under conditions usually attainable in the rotary kiln, that is, at temperatures not over about 1800° C. and for periods not exceeding about an hour. The product, because of its dense structure, high purity, low residual shrinkage, and toughness, is desirable for use in a number of fields. It is highly useful, for instance, for refractories, heat-exchange media and abrasives.

In this specification and claims porosity where expressed is in percentage by volume and other percentages and parts are by weight.

In conformity with common practice in reporting chemical analyses of refractory materials, in the specification and claims the proportions of the various chemical constituents present in a material are given as though these constituents were present as the simple oxides. Thus, the magnesium constituent is referred to as magnesium oxide or MgO, the iron constituent as $Fe_2O_3$, the silicon constituent as $SiO_2$, and so on for other elements reported, although the silica or iron oxide and a very small proportion of the MgO, for example, may be present in combination with each other or with another minor constituent. For example, the term "1.0% by weight of iron as, or calculated as $Fe_2O_3$" is intended to mean that a chemical analysis of the material referred to would show the iron content as 1.0% expressed as $Fe_2O_3$, although in reality all of the iron might be present in the form of magnesium ferrite or in some other combined form.

The term "magnesium compound which will yield periclase upon firing," or "magnesia-yielding" or "periclase-yielding compound" is intended to include cryptocrystalline magnesia, or amorphous magnesia, as well as magnesium compounds such as magnesium hydroxide, magnesium carbonate or basic carbonate, magnesium alcoholate, magnesium acetate and the like which upon firing yield magnesia or periclase. The dispersing of the iron compound in the liquid is intended to include the production of a solution of the iron compound and also of a colloidal suspension thereof.

Having now described the invention, what is claimed is:

1. Process for preparing crystalline magnesia which comprises uniformly admixing a finely divided magnesium compound which will yield periclase upon firing and containing at least 95% MgO, not over 2% CaO, and not over 2% $SiO_2$ on the fired basis, a water solution of an iron compound and a chromium-containing material, said iron compound and said chromium-containing material being added in an amount to provide up to a total of 1.0% of $Fe_2O_3$ plus $Cr_2O_3$, as added, in the fired product, and firing said admixture at a temperature of at least 1300° C. to form periclase, said iron compound being added to provide a minimum amount of on the order of about $\frac{1}{16}$% $Fe_2O_3$.

2. Process as in claim 1 wherein the iron compound is ferric chloride.

3. Process as in claim 1 wherein the chromium material is chromic acid.

4. Process of preparing crystalline magnesia which comprises uniformly admixing a finely divided magnesium compound which will yield periclase upon firing and containing at least 95% MgO, not over 2% CaO, and not over 2% $SiO_2$ on the fired basis, a liquid, an iron compound, said iron compound being dispersed in said liquid, and a chromium-containing material, said iron compound and said chromium-containing material being added in amounts to provide up to a total of 1.0% of $Fe_2O_3$ plus $Cr_2O_3$, as added, in the fired product, calcining said admixture at less than about 1300° C. to form a cryptocrystalline magnesia-containing product, pressing said calcined product, and firing at a temperature of at least 1300° C. to form well-crystallized periclase, said iron compound being added to provide a minimum amount of on the order of about $\frac{1}{16}$% $Fe_2O_3$.

5. Process of preparing crystalline magnesia which comprises calcining at less than about 1300° C. a magnesium compound which will yield periclase upon firing and containing at least 95% MgO, not over 2% CaO, and not over 2% $SiO_2$ on the fired basis, intimately admixing said calcined material, an iron compound dispersed in a liquid, and a chromium-containing material, said iron compound and said chromium-containing material being added in amounts to provide up to a total of 1.0% of $Fe_2O_3$ plus $Cr_2O_3$, as added, in the fired product, pressing said admixture, and firing at a temperature of at least 1300° C. to form well-crystallized periclase, said iron compound being added to provide a minimum amount of on the order of about $\frac{1}{16}$% $Fe_2O_3$.

6. Process for preparing crystalline magnesia which comprises uniformly admixing a finely divided magnesium compound which will yield periclase upon firing and containing at least 95% MgO, not over 2% CaO, and not over 2%

$SiO_2$ on the fired basis, and a water dispersion of an iron compound in an amount which will provide up to 1% $Fe_2O_3$, as added, in the fired product, calcining at less than about 1300° C. to form a mixture containing cryptocrystalline magnesia, admixing with said cryptocrystalline magnesia mixture up to 90%, based on the total weight of dry ingredients, of finely divided well-crystallized periclase, pressing and firing at a temperature of at least 1600° C. to form well-crystallized periclase.

7. Process for preparing crystalline magnesia which comprises admixing a finely divided magnesium compound which will yield periclase upon firing and containing at least 95% MgO, not over 2% CaO, and not over 2% $SiO_2$ on the fired basis, a chromium-containing material, and a water dispersion of the iron compound, said iron compound and said chromium-containing material being added in amounts to provide up to a total of 1.0% of $Fe_2O_3$ plus $Cr_2O_3$, as added, in the fired product, calcining at less than about 1300° C. to form a mixture containing cryptocrystalline magnesia, admixing with said cryptocrystalline magnesia mixture up to 90%, based on the total weight of dry ingredients of finely divided well-crystallized periclase, pressing and firing at a temperature of at least 1600° C. to form well-crystallized periclase.

8. Process of preparing well-crystallized periclase comprising admixing with a mixture of cryptocrystalline magnesia containing at least 95% MgO, not over 2% CaO, and not over 2% $SiO_2$ on the fired basis, and a water dispersion of an iron compound in amounts to provide up to 1.0% $Fe_2O_3$, as added, in the fired product, up to 90%, based on the total weight of dry ingredients, of finely divided well-crystallized periclase, pressing, and firing at a temperature of at least 1600° C. to form well-crystallized periclase.

9. Process of preparing well-crystallized periclase comprising admixing with a mixture of cryptocrystalline magnesia containing at least 95% MgO, not over 2% CaO, and not over 2% $SiO_2$ on the fired basis, and a chromium-containing material and a water dispersion of an iron compound in amounts to provide up to 1.0% $Fe_2O_3$ plus $Cr_2O_3$, as added, in the fired product, up to 90%, based on the total weight of dry ingredients, of finely divided well-crystallized periclase, pressing, and firing at a temperature of at least 1600° C. to form well-crystallized periclase, said iron compound being added to provide a minimum amount of on the order of about $\frac{1}{16}$% $Fe_2O_3$.

10. Process for preparing well-crystallized, high purity magnesia which comprises admixing a finely divided magnesium compound which will yield periclase upon firing, and containing at least 95% MgO, and not over 2% CaO, and not over 2% $SiO_2$ on the ignited basis, and an iron compound, said iron compound being added as a dispersion in a liquid, and in an amount to provide up to 1.0% by weight $Fe_2O_3$, as added, in the fired product, and firing said admixture at a temperature of at least 1300° C. to form periclase.

11. Process as in claim 10 wherein said iron compound is added as a solution in water.

12. Process as in claim 10 wherein said iron compound is added as a colloidal suspension in water.

13. Process as in claim 10 wherein said magnesium compound is precipitated magnesium hydroxide.

14. Process as in claim 10 wherein said magnesium compound is precipitated magnesium carbonate.

15. Process as in claim 10 wherein said iron compound is ferric chloride.

16. Process as in claim 10 wherein said magnesium compound contains not over 1% $Fe_2O_3$ on the ignited basis.

17. Process as in claim 10 wherein said admixture is fired at a temperature of from 1300° C. to 1800° C.

18. Process for preparing well-crystallized, high purity magnesia which comprises admixing a finely divided magnesium compound which will yield periclase upon firing, and containing at least 95% MgO, and not over 2% CaO, and not over 2% $SiO_2$ on the ignited basis, and at least one iron compound chosen from the group consisting of ferric chloride, ferrous chloride, ferrous sulfate, ferric sulfate, ferrous nitrate, ferric nitrate, potassium ferrocyanide, potassium ferricyanide, sodium ferrocyanide, sodium ferricyanide, iron acetate and iron hydroxide, said iron compound being added as a dispersion in a liquid and in an amount to provide up to 1.0% by weight $Fe_2O_3$, as added, in the fired product, and firing said admixture at a temperature of at least 1300° C. to form periclase.

LESLIE W. AUSTIN.

References Cited in the file of this patent

UNITED STATES PATENTS

| Number | Name | Date |
|---|---|---|
| 1,527,347 | Browne | Feb. 24, 1925 |
| 1,880,315 | Crotogino | Oct. 4, 1932 |
| 2,281,477 | Chesny | Apr. 28, 1942 |
| 2,447,412 | Heuer | Aug. 17, 1948 |
| 2,487,290 | Austin et al. | Nov. 8, 1949 |

FOREIGN PATENTS

| Number | Country | Date |
|---|---|---|
| 546,642 | Great Britain | July 23, 1942 |
| 583,009 | Great Britain | Dec. 4, 1946 |